United States Patent
Kubo et al.

(10) Patent No.: US 9,314,879 B2
(45) Date of Patent: Apr. 19, 2016

(54) LEAD-FREE SOLDER FLUX AND LEAD-FREE SOLDER PASTE

(75) Inventors: Natsuki Kubo, Osaka (JP); Eiji Iwamura, Kanagawa (JP)

(73) Assignee: Arakawa Chemical Industries, Ltd., Osaka (JP)

( * ) Notice: Subject to any disclaimer, the term of this patent is extended or adjusted under 35 U.S.C. 154(b) by 240 days.

(21) Appl. No.: 13/989,917

(22) PCT Filed: Dec. 16, 2011

(86) PCT No.: PCT/JP2011/079135
§ 371 (c)(1),
(2), (4) Date: Jul. 11, 2013

(87) PCT Pub. No.: WO2012/081688
PCT Pub. Date: Jun. 21, 2012

(65) Prior Publication Data
US 2013/0276937 A1 Oct. 24, 2013

(30) Foreign Application Priority Data
Dec. 17, 2010 (JP) ................................. 2010-281327

(51) Int. Cl.
| | | |
|---|---|---|
| *B23K 35/02* | (2006.01) | |
| *B23K 35/26* | (2006.01) | |
| *B23K 35/36* | (2006.01) | |
| *B23K 35/362* | (2006.01) | |
| *C22C 13/00* | (2006.01) | |
| *C22C 1/04* | (2006.01) | |
| *C22C 9/00* | (2006.01) | |

(52) U.S. Cl.
CPC ............... *B23K 35/025* (2013.01); *B23K 35/26* (2013.01); *B23K 35/262* (2013.01); *B23K 35/362* (2013.01); *B23K 35/3615* (2013.01); *C22C 1/0483* (2013.01); *C22C 13/00* (2013.01); *C22C 9/00* (2013.01)

(58) Field of Classification Search
CPC ... B23K 35/3611; B23K 35/025; B23K 35/26
USPC ..................................................... 219/145.21
See application file for complete search history.

(56) References Cited

U.S. PATENT DOCUMENTS 3,660,127 A * 5/1972 Aronberg .................... 106/286.8
2001/0042779 A1 * 11/2001 Amita et al. ................... 228/224

FOREIGN PATENT DOCUMENTS

| JP | 6-269988 | 9/1994 |
|---|---|---|
| JP | 2001-232495 | 8/2001 |
| JP | 2002-86292 | 3/2002 |
| JP | 2008-030103 | 2/2008 |

OTHER PUBLICATIONS

International Preliminary Report on Patentability issued Jun. 18, 2013 and English translation of Written Opinion of the International Searching Authority issued Mar. 13, 2012 in corresponding International Application No. PCT/JP2011/079135.
International Search Report issued Mar. 13, 2012 in International (PCT) Application No. PCT/JP2011/079135.

* cited by examiner

*Primary Examiner* — Weiping Zhu
(74) *Attorney, Agent, or Firm* — Wenderoth, Lind & Ponack, L.L.P.

(57) ABSTRACT

A principal object of the present invention is to provide a flux which can be used to produce a lead-free solder paste which is excellent in viscosity stability and exhibits excellent wettability at the time of soldering even in atmospheric air. The flux is a lead-free solder flux having a bromine atom concentration of 400 to 20000 ppm based on 0.1 g of the flux and comprising 0.01 to 0.7% by weight of an amine compound (a) represented by the general formula (1): $H_2N$—$(CH_2)_n$—X—$(CH_2)_n$—$NH_2$ (wherein n represents an integer of 1 to 6 and X represents —NH—$CH_2CH_2$—NH— or a piperazine residue).

7 Claims, No Drawings

LEAD-FREE SOLDER FLUX AND LEAD-FREE SOLDER PASTE

TECHNICAL FIELD

The present invention relates to a lead-free solder flux and a lead-free solder paste.

BACKGROUND ART

Solder flux is a material used far surface mounting of electronic components such as ICs, capacitors and resistors on a printed circuit board and it serves as a principal component of solder paste. During surface mounting, solder paste is supplied onto electrodes on a printed circuit board by means of a screen printer, a dispenser, etc, and then electronic components are mounted on the electrodes, and then the solder-paste applied onto the board is re flowed at a temperature equal to or higher than the melting point of the solder metal and thus the electronic components and the electrodes are connected.

Lead-free solders (Sn—Ag—Cu based solders, Sn—Cu based solders, etc.) are easily oxidized due to, for example, their small average particle sizes, broad particle size distributions and higher melting points than those of lead eutectic solders (Sn—Pb based solders etc.), which used to be commonly used. Solder paste using lead-free solders consequently have a problem of insufficient wetting and spreading on electrodes, i.e., so-called "poor wetting" during the soldering process.

Accordingly, various means such as controlling preheat temperature and soldering in nitrogen atmosphere have been conventionally taken. However, control of preheat temperature cannot effectively prevent poor wetting. In cases where soldering is performed in nitrogen atmosphere, decrease in wettability can be prevented but manufacturing costs will increase. In recent years soldering in the atmospheric air has become common and there has been a great need for a method for preventing decrease in wettability in atmospheric air.

Also in recent years, as electric appliances have been further miniaturized, solder paste has been greatly required to have a printing performance compatible with minute electrode patterns on a mounting board. As a means to improve the printing performance of solder paste, reduction in the average particle size of solder powder has been investigated, for example. By this means, however, the surface area of solder powder increases and the solder paste becomes more susceptible to oxidization, which results in deterioration of the wettability. Another means is use of a halogen compound in solder paste. By this means, however, especially with the use of a bromine compound, the solder paste tends to thicken with time, which results in reduction in the storage stability. Increase in the viscosity of the solder paste also tends to cause poor wetting. Also when electrodes are oxidized, poor wetting tends to occur. Poor wetting is a huge problem especially in surface mounting under high temperature and high humidity.

A known means to improve the storage stability of flux is, for example, to inhibit the reaction between a solder powder and a halogen activator by limiting the concentration of halogen ions (bromine ions etc.) to 300 ppm or less, expressed in terms of chlorine, based on 0.1 g of flux (see Patent Literature 1). The flux obtained by this means, however, lacks sufficient wettability for soldering in atmospheric air.

CITATION LIST

Patent Literature

Patent Literature 1: JP 2002-86292 A

SUMMARY OF INVENTION

Technical Problem

A principal object of the present invention is to provide a novel flux which can be used to produce a lead-free solder paste which is excellent in viscosity stability and exhibits excellent wettability at the time of soldering even in atmospheric air.

Solution to Problem

The inventors found that the above problems can be solved by limiting the bromine atom content of a flux to a predetermined range and adding to the flux a predetermined amount of an amine compound of some type and thus completed the present invention.

That is, the present invention relates to a lead-free solder flux having a bromine atom concentration of 400 to 20000 ppm based on 0.1 g of the flux and comprising 0.01 to 0.7% by weight of an amine compound (a) represented by the general formula (1): $H_2N$—$(CH_2)_n$—X—$(CH_2)_n$—$NH_2$ (wherein n represents an integer of 1 to 6 and X represents —NH—$CH_2CH_2$—NH— or a piperazine residue) (hereinafter simply referred to as the flux); and a lead-free solder paste comprising the flux and a lead-free solder powder (hereinafter simply referred to as the solder paste).

Advantageous Effects of Invention

The flux of the present invention can impart to a solder paste excellent storage stability and excellent wettability for soldering not only in nitrogen atmosphere but also in atmospheric air. Therefore the flux of the present invention can also be suitably used with a lead-free solder powder which tends to be oxidized and cause poor wetting. The solder paste of the present invention is excel lent in terms of solder balling during the reflow process and of suitability for continuous screen printing and is suitable for surface mounting under high temperature and high humidity, at which electrodes (copper, nickel, etc.) are readily oxidized.

DESCRIPTION OF EMBODIMENTS

The flux of the present invention is characterized in that it has a bromine atom concentration of 400 to 20000 ppm based on 0.1 g of the flux and comprises 0.01 to 0.7% by weight of an amine compound (a) represented by the general formula (1): $H_2N$—$(CH_2)_n$—X—$(CH_2)_n$—$NH_2$ (wherein n represents an integer of 1 to 6 and X represents —NH—$CH_2CH_2NH$— or a piperazine residue) (hereinafter referred to as Component (a)).

The bromine atom concentration in the flux of the present invention is preferably 400 to 20000 ppm, more preferably 800 to 20000 ppm, further more preferably 3000 to 18000 ppm, much more preferably 7000 to 15000 ppm, in view of the storage stability and wettability of the solder paste. The concentration can be measured by, for example, combustion ion chromatography. Specifically, 0.1 g of the flux is combusted at high temperature (usually about 1200 to 1300° C.), the combustion gas is passed through purified water to be dissolved therein, and the bromine ions collected in the purified water are determined on an ion chromatography device. For creating a calibration curve, a solid standard sample with a known bromine concentration is used. This measurement method is also applicable to the measurement of the concentration of other halogens such as chlorine.

As Component (a), any known compound of various kinds can be used without particular limitation as long as it is represented by the above formula. The "piperazine residue" in the formula refers to the structure remained after removal of the two hydrogen atoms on the nitrogen atoms of piperazine. Specific examples of Component (a) include N,N'-bis(4-aminobutyl)-1,2-ethanediamine, triethylenetetramine, N,N'-(3-aminopropyl)ethylenediamine, N,N'-bis(3-aminopropyl)piperazine, etc. Among these, preferred is the compound of the formula in which n is an integer of 1 to 3 in view of wettability and specific examples thereof include at least one selected from the group consisting of N,N'-bis(3-aminopropyl)ethylenediamine, N,N'-bis(3-aminopropyl)piperazine and triethylenetetramine. The Component (a) content is usually about 0.01 to 0.7% by weight, preferably about 0.06 to 0.6% by weight, more preferably 0.1 to 0.3% by weight, in view of storage stability and wettability.

The bromine atoms contained in the flux of the present invention are derived from at least one bromine compound (b) selected from the group consisting of a carboxyl group-containing bromine compound, a hydroxy group-containing bromine compound, an amino group-containing bromine compound and a no active hydrogen-containing bromine compound (hereinafter referred to as Component (b)). The "active hydrogen" refers to the active hydrogen contained in a carboxyl group, a hydroxyl group or an amino group.

Specific examples of the carboxyl group-containing bromine compound include bromodicarboxylic acids such as 3-bromopropionic acid, 2-bromovaleric acid, 5-bromo-n-valeric acid, 2-bromoisovaleric acid, 2,3-dibromosuccinic acid, 2-bromosuccinic acid, and 2,2-dibromoadipic acid. Examples of the hydroxyl group-containing bromine compound include bromodiols such as 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 1,4-dibromo-2,3-butanediol, 2,3-dibromo-2-butene-1,4-diol, and 2,2-bis(bromomethyl)-1,3-propanediol. Examples of the amino group-containing bromine compound include bromoamines such as ethylamine bromate, diethylamine bromate, and methylamine bromate. Examples of the no active hydrogen-containing bromine compound include bromoalkanes such as 1,2,3,4-tetrabromobutane and 1,2-dibromo-1-phenylethane; bromoalkenes such as 1-bromo-3-methyl-1-butene, 1,4-dibromobutene, 1-bromo-1-propene, 2,3-dibromopropene, and 1,2-dibromostyrene; other no active hydrogen-containing bromine compounds such as 4-stearoyloxybenzyl bromide, 4-stearyloxybenzyl bromide, 4-stearylbenzyl bromide, 4-bromomethylbenzyl stearate, 4-stearoylaminobenzyl bromide, 2,4-bisbromomethylbenzyl stearate, 4-palmitoyloxybenzyl bromide, 4-myristoyloxybenzyl bromide, 4-lauroyloxybenzyl bromide, and 4-undecanoyloxybenzyl bromide. Preferred as Component (b) are, in view of storage stability and wettability, at least one selected from the group consisting of the bromocarboxylic acids, bromoalcohols, bromoalkanes and bromoalkenes, and more preferred are the bromocarboxylic acids and/or bromoalcohols.

The Component (b) content of the flux is not particularly limited as long as the bromine atom concentration is in the above range, and the content is usually about 0.5 to 3% by weight, preferably about 1 to 2.5% by weight, more preferably 1 to 2% by weight.

The flux of the present invention may further comprise a known rosin base material (c) of various kinds (hereinafter referred to as Component (c)), an activator (d) (other than Components (a) and (b); hereinafter referred to as Component (d)), a thixotropic agent (e) (hereinafter referred to as Component (e)), and a solvent (f) (hereinafter referred to as Component (f)). These usually do not contain any bromine atom.

Examples of Component (c) include raw material rosins such as gum rosin, wood rosin, and tall oil rosin; treated rosins such as hydrogenated rosins and polymerized rosins obtained from raw material rosins; Diels-Alder reaction reactants (acrylic acid modified rosin, fumaric acid modified rosin, maleic acid modified rosin, etc.) obtained from the reaction between a raw material rosin or treated rosin and an α,β-unsaturated carbooxylic acid ((meth)acrylic acid, fumaric acid, (anhydrous) maleic acid, etc.); ester compounds obtained by esterification between a raw material rosin, treated rosin or Diels-Alder reaction reactant and a polyalcohol (glycerin, pentaerythritol, etc.); etc. Among the above Components (c), preferred are hydrogenated rosins and/or acrylic acid modified rosins in view of storage stability and especially wettability. The Component (c) content of the flux is also not limited but is usually about 25 to 69% by weight, preferably about 30 to 56% by weight, more preferably 40 to 50% by weight.

Other base materials that can be used in addition to Component (c) are synthetic resins such as epoxy resin, acrylic resin, polyimide resin, nylon resin, polyacrylonitrile resin, vinyl chloride resin, vinyl acetate resin, polyolefin resin, fluororesin, and ABS resin; elastomers such as isoprene rubber, styrene butadiene rubber (SBR), butadiene rubber (BR), chloroprene rubber, nylon rubber, nylon elastomer, and polyester elastomer; etc.

Examples of Component (d) include non-halogen activators such as succinic acid, benzoic acid, adipic acid, glutaric acid, palmitic acid, stearic acid, picolinic acid, azelaic acid, sebacic acid, dodecanedioic acid, and dimer acid; chlorine activators such as diethylamine hydrochloride; etc. The Component (d) content of the flux is also not particularly limited but is usually about 1 to 15% by weight, preferably about 5 to 13% by weight, more preferably 9 to 12% by weight in view of especially wettability.

Examples of Component (e) include animal- and plant-derived thixotropic agents such as castor oil, hydrogenated castor oil, beeswax, and carnauba wax; amide thixotropic agents such as stearamide and ethylenebis-12-hydroxystearamide; etc. The Component (e) content of the flux is also not particularly limited but is usually about 3 to 10% by weight, preferably about 5 to 8% by weight, more preferably 5 to 7% by weight, in view of the suitability for continuous screen printing.

Examples of Component (f) include lower alcohols such as ethanol, n-propanol, isopropanol, and isobutanol; ether alcohols such as butyl carbitol, hexyl diglycol, and hexyl carbitol; esters such as isopropyl acetate, ethyl propionate, butyl benzoate, and diethyl adipate; hydrocarbons such as n-hexane, dodecane, and tetradecene; etc. Among there, preferred are ether alcohols, which have high boiling points, in view of the temperature for reflow (usually 230 to 260° C.). The Component (f) content of the flux is not particularly limited but is usually about 26.49 to 50% by weight, preferably about 32.94 to 45% by weight, more preferably 34.9 to 45% by weight.

The flux of the present invention can further comprise additives such as an antioxidant, an antifungal and a delusterant. Examples of the antioxidant include 2,6-di-t-butyl-p-cresol, para-tert-amylphenol, 2,2'-methylenebis(4-methyl-6-tert-butylphenol), etc. The additive content of the flux is usually about 0.1 to 5% by weight.

The flux of the present invention can be obtained by melting and kneading the above components. Kneading can be performed with, for example, a planetary mill etc.

The solder paste of the present invention comprises the flux of the present invention and a lead-free solder powder. The flux content of the solder paste is not particularly limited and is usually about 5 to 30% by weight. The lead-free solder powder content of the solder pasts is not particularly limited and is usually about 70 to 95% by weight. The solder paste can also be produced with a known kneading apparatus.

Examples of the lead-free solder powder include Sn—Ag based powder, Sn—Zn based powder, Sn—Ag—Cu based powder, Au—Si based powder, Bi—Cu based powder, and these powders doped with Cu, Bi, In, Ni, Sb, Al, etc. The solder particle size is also not particularly limited and the average primary particle size is usually about 1 to 50 µm, preferably about 5 to 40 µm, more preferably 10 to 30 µm. The average primary particle size can be measured by, for example, laser diffraction/scattering particle size distribution measurement. The solder particles may be in an infinite form, a spherical form, etc. and in the case of a spherical form, the aspect ratio is usually 1.2 or lower.

The properties of the solder paste of the present invention is not particularly limited and, for example, the viscosity measured by a spiral method (in accordance with JIS Z 3284, appendix 6) is usually about 100 to 300 Pa·s and the thixotropic index calculated from the viscosity is usually about 0.3 to 0.7. When the solder paste has a viscosity and a thixotropic index in these ranges, its suitability for continuous screen printing is improved.

EXAMPLES

The present invention will be explained in more detail with reference to Examples and Comparative Examples but is not limited thereto.

(1) Preparation of Flux

Example 1

The components shown in Table 1 (100% by weight in total) were mixed to give 3700 g of a flux.

TABLE 1

| Component | Compound | % by weight |
|---|---|---|
| (a) | N,N'-bis(3-aminopropyl)ethylenediamine (Tokyo Chemical Industry Co., Ltd.) | 0.1 |
| (b) | 3-bromopropionic acid (Tokyo Chemical Industry Co., Ltd.) | 0.5 |
|  | Trans-2,3-dibromo-2-butene-1,4-diol (Tokyo Chemical Industry Co., Ltd.) | 1.0 |
| (c) | Hydrogenated rosin (Arakawa Chemical Industries, Ltd.) | 22.5 |
|  | Acrylic acid modified rosin (Arakawa Chemical Industries, Ltd.) | 22.5 |
| (d) | Sebacic acid (Tokyo Chemical Industry Co., Ltd.) | 3.0 |
|  | Dimer acid (Trade name "PRIPOLE 1010", Uniqema Ltd.) | 6.0 |

TABLE 1-continued

| Component | Compound | % by weight |
|---|---|---|
| (e) | Ethylenebis-12-hydroxystearamide (Trade name "MAWAXO", Kawaken Fine Chemicals Co., Ltd.) | 8.0 |
| (f) | Hexyl diglycol (Nippon Nyukazai Co., Ltd.) | 35.9 |
| Additive | Antioxidant (Trade name "Irganox 1010", Ciba Japan K.K.) | 0.5 |
| Total |  | 100 |

Next, 0.1 g of the flux was taken out and then was combusted at 1250° C. in a commercially available combustion device (product name: "Automatic Quick Furnace AQF-100" (Mitsubishi Chemical Analytech Co., Ltd.)) and the generated combustion gas was passed through purified water to give a sample solution. The sample solution was injected into an ion chromatography device (product name: "DX-500" (Nippon Dionex K.K.)) and the bromide ion concentration was automatically measured. With reference to the calibration curve obtained by plotting the peaks of bromine atoms, the concentration based on the number of the bromine atoms derived from the above Component (b) was determined to be about 9100 ppm based on 0.1 g of the flux. As the standard reference material, a bromide ion standard solution (Wako Pure Chemical Industries, Ltd.) was used.

Example 2

A flux (100% by weight in total) was prepared in the same manner as in Example 1 except that N,N'-bis(3-aminopropyl)ethylenediamine was replaced with N,N'-bis(3-aminopropyl)piperazine (Tokyo Chemical Industry Co., Ltd.) (0.1% by weight). The bromine atom concentration based on analysis of 0.1 g of the flux was about 9100 ppm.

Example 3

A flux (100% by weight in total) was prepared, in the same manner as in Example 1 except that N,N'-bis(3-aminopropyl)ethylenediamine was replaced with triethylenetetramine (Tokyo Chemical Industry Co., Ltd.) (0.1% by weight). The bromine atom concentration based on analysis of 0.1 g of the flux was about 9100 ppm.

Example 4

A flux (100% by weight in total) was prepared in the same manner as in Example 1 except that N,N'-bis(3-aminopropyl)ethylenediamine was replaced with triethylenetetramine (0.5% by weight) and that the amount of hexyl diglycol was changed to 35.5% by weight. The bromine atom concentration based on analysis of 0.1 g of the flux was about 9100 ppm.

Example 5

A flux (100% by weight in total) was prepared in the same manner as in Example 1 except that the amount of 3-bromopropionic acid was changed to 0.1% by weight, that trans-2,3-dibromo-2-butene-1,4-diol was not used (0% by weight), and that the amounts of the hydrogenated rosin and the acrylic acid modified rosin were changed to 23.2% by weight. The bromine atom concentration based on analysis of 0.1 g of the flux was about 520 ppm.

Example 6

A flux (100% by weight in total) was prepared in the same manner as in Example 1 except that the amount of trans-2,3- dibromo-2-butene-1,4-diol was changed to 2.5% by weight, that N,N'-bis(3-aminopropyl)ethylenediamine was replaced with triethylenetetramine (0.5% by weight), that the amounts of the acrylic acid modified rosin and the hydrogenated rosin were changed to 22.0% by weight, and that the amount of hexyl diglycol was changed to 35.0% by weight. The bromine atom concentration based on analysis of 0.1 g of the flux was about 18800 ppm.

Example 7

A flux (100% by weight in total) was prepared in the same manner as in Example 1 except that 3-bromopropionic acid and trans-2,3-dibromo-2-butene-1,4-diol together were replaced with 2.3% by weight of 1,2,3,4-tetrabromobutane and that the amount of hexyl diglycol was changed to 35.1% by weight. The bromine atom concentration based on analysis of 0.1 g of the flux was about 19700 ppm.

Example 8

A flux (100% by weight in total) was prepared in the same manner as in Example 1 except that 3-bromopropionic acid and trans-2,3-dibromo-2-butene-1,4-diol together were replaced with 2.3% by weight of 2,2-bis(bromomethyl)-1,3-propanediol and that the amount of hexyl diglycol was changed to 35.1% by weight. The bromine atom concentration based on analysis of 0.1 g of the flux was about 14000 ppm.

Example 9

A flux (100% by weight in total) was prepared in the same manner as in Example 1 except that 3-bromopropionic acid and trans-2,3-dibromo-2-butene-1,4-diol together were replaced with 0.07% by weight of 2,2-bis(bromomethyl)-1,3-propanediol and that the amount of hexyl diglycol was changed to 37.33% by weight. The bromine atom concentration based on analysis of 0.1 g of the flux was about 410 ppm.

Comparative Example 1

A flux (100% by weight in total) was prepared in the same manner as in Example 1 except that neither 3-bromopropionic acid, trans-2,3-dibromo-2-butene-1,4-diol, nor N,N'-bis(3-aminopropyl)ethylenediamine was used (0% by weight) and that the amount of hexyl diglycol was changed to 37.5% by weight. The bromine atom concentration based on analysis of 0.1 g of the flux was about 0 ppm.

Comparative Example 2

A flux (100% by weight in total) was prepared in the same manner as in Example 1 except that the amount of 3-bromopropionic acid was changed to 0.04% by weight, that trans-2,3-dibromo-2-butene-1,4-diol was not used (0% by weight), and that the amounts of the hydrogenated rosin and the acrylic acid modified rosin were changed to 23.23% by weight. The bromine atom concentration based on analysis of 0.1 g of the flux was about 210 ppm.

Comparative Example 3

A flux (100% by weight in total) was prepared in the same manner as in Example 1 except that the amount of 3-bromopropionic acid was changed to 0.07% by weight, that trans-2,3-dibromo-2-butene-1,4-diol was not used (0% by weight), that the amount of the hydrogenated rosin was changed to 23.22% by weight, and that the amount of the acrylic acid modified rosin was changed to 23.21% by weight. The bromine atom concentration based on analysis of 0.1 g of the flux was about 360 ppm.

Comparative Example 4

A flux (100% by weight in total) was prepared in the same manner as in Example 1 except that the amount of 3-bromopropionic acid was changed to 2.1% by weight, that the amount of trans-2,3-dibromo-2-butene-1,4-diol was changed to 2.0% by weight, and that the amounts of the acrylic acid modified rosin and the hydrogenated rosin were changed to 21.2% by weight. The bromine atom concentration based on analysis of 0.1 g of the flax was about 24600 ppm.

Comparative Example 5

A flux (100% by weight in total) was prepared in the same manner as in Example 1 except that the amount of N,N'-bis-3-aminopropyl)ethylenediamine was changed to 0% by weight and that the amount of hexyl diglycol was changed to 36.0% by weight. The bromine atom concentration based on analysis of 0.1 g of the flux was about 9100 ppm.

Comparative Example 6

A flux (100% by weight in total) was prepared in the same manner as in Example 1 except that 3-bromopropionic acid and trans-2,3-dibromo-2-butene-1,4-diol together were replaced with 1.6% by weight of 1,2,3,4-tetrabromobutane and that N,N'-bis(3-aminopropyl)ethylenediamine was not used (0% by weight). The bromine atom concentration based on analysis of 0.1 g of the flux was about 13700 ppm.

Comparative Example 7

A flux (100% by weight in total) was prepared in the same manner as in Example 1 except that 3-bromopropionic acid was not used, that N,N'-bis(3-aminopropyl)ethylenediamine was replaced with 0.5% by weight of triethanolamine, and that the amount of hexyl diglycol was changed to 36.0% by weight. The bromine atom concentration based on analysis of 0.1 g of the flux was about 6500 ppm.

Comparative Example 8

A flux (100% by weight in total) was prepared in the same manner as in Example 1 except that 3-bromopropionic acid was not used, that N,N'-bis(3-aminopropyl)ethylenediamine was replaced with 0.5% by weight of diethylamide, and that the amount of hexyl diglycol was changed to 36.0% by weight. The bromine atom concentration based on analysis of 0.1 g of the flux was about 6500 ppm.

Comparative Example 9

A flux (100% by weight in total) was prepared in the same manner as in Example 1 except that 3-bromopropionic acid and trans-2,3-dibromo-2-butene-1,4-diol together were replaced with 1.5% by weight of diethylamine hydrochloride. The chlorine atom concentration in the flux measured by the combustion ion chromatography in Example 1 was about 4900 ppm based on 0.1 g of the flux. As the standard reference material, a chloride ion standard solution (Wako Pure Chemical Industries, Ltd.) was used.

(2) Preparation of Solder paste

Examples 1 to 9 and Comparative Examples 1 to 9

A solder paste was prepared by blending and kneading 11.0% by weight of the flax of Example 1 and 89.0% by weight of a lead-free solder powder (Sn (96.5% by weight)-Ag (3.0% by weight)-Cu (0.5% by weight); average primary particle size of 10 to 25 µm; made by Yamaishi Metal Co., Ltd.) with a planetary mill. With the use of the fluxes of Examples 2 to 9 and Comparative Examples 1 to 9, solder pastes were prepared in the same manner as above.

Example 10

A solder paste was prepared in the same manner as in Example 1 except that the lead-free solder powder was replaced with a rather coarse lead-free solder powder (Sn (96.5% by weight)-Ag (3.0% by weight)-Cu (0.5% by weight); average primary particle size of 20 to 38 µm; made by Mitsui Mining & Smelting Co., Ltd.).

(3) Evaluation of Storage Stability

The viscosity of the solder paste of Example 1 was measured with a commercially available spiral viscometer (product name: "PCU-205" co-axial double cylinder type; made by Malcolm Co., Ltd.) immediately after preparation and after kept at 40° C. in a constant temperature reservoir for 24 hours. The viscosity increase ratio of the solder paste was calculated from the formula shown below.

Viscosity increase ratio=[(Viscosity measured at 10 rpm of solder paste after kept at 40° C. for 24 hours−Viscosity measured at 10 rpm of solder paste immediately after preparation)/(Viscosity measured at 10 rpm of solder paste immediately after preparation)]×100

The above warm condition was intended for performing a temperature-accelerated test, and the viscosity increase ratio in this examination substantially reproduces the viscosity increase ratio after stored at 0 to 10° C. for three months or more. A solder paste with a viscosity increase ratio of less than 10% was determined to have excellent storage stability. With the use of the fluxes of Examples 2 to 10 and Comparative Examples 1 to 9, solder pastes were prepared in the same manner as above.

(4) Wettability Test (without Oxidation Treatment of Copper Electrodes)

The wettability of the solder paste of Example 1 on a copper electrode plate was evaluated under atmospheric air (in accordance with JIB Z 3284, appendix 11) immediately after production and after kept at 40° C. in a constant temperature reservoir for 24 hours. The evaluation was also carried out for the solder pastes of other Examples and Comparative Examples in the same manner as above.

(5) Wettability Test (with Oxidation Treatment of Copper Electrodes)

The wettability of the solder paste of Example 1 was evaluated in the same manner as in the above test (4) except that the copper electrode board was replaced with a copper electrode board that was oxidized (40° C. and 90% humidity for 24 hours). The evaluation was also carried out for the solder pastes of other Examples and Comparative Examples in the same manner as above.

The results of the wettability tests were evaluated based on the following criteria:
1. The solder melted from the solder paste wetted the test plate and spread beyond the area on which the paste was applied.
2. The solder wetted the whole area on which, the solder paste was applied.
3. The solder wetted most of the area on which the solder paste was applied.
4. The solder did not wet the test plate and the melted solder formed one or more solder balls.

In this evaluation, the solder pastes to which "1" or "2" was given were determined to have excellent wettability.

The results of Examples 1 to 10 are shown in Table 2. The results of Comparative Examples 1 to 9 are shown in Table 3.

TABLE 2

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Bromine atom concentration based on 0.1 g of flux (ppm) | | 9100 | 9100 | 9100 | 9100 | 520 | 18800 | 19700 | 14000 | 410 | 9100 |
| Content of Component (a) in flux (% by weight) | BAPED | 0.1 | 0 | 0 | 0 | 0.1 | 0 | 0.1 | 0.1 | 0.1 | 0.1 |
| | BAPP | 0 | 0.1 | 0 | 0 | 0 | 0 | 0 | 0 | 0 | 0 |
| | TETA | 0 | 0 | 0.1 | 0.5 | 0 | 0.5 | 0 | 0 | 0 | 0 |
| Content of Component (b) in flux (% by weight) | BP | 0.5 | 0.5 | 0.5 | 0.5 | 0.1 | 0.5 | 0 | 0 | 0 | 0.5 |
| | DBBD | 1.0 | 1.0 | 1.0 | 1.0 | 0 | 2.5 | 0 | 0 | 0 | 1.0 |
| | TBB | 0 | 0 | 0 | 0 | 0 | 0 | 2.3 | 0 | 0 | 0 |
| | BBMPD | 0 | 0 | 0 | 0 | 0 | 0 | 0 | 2.3 | 0.07 | 0 |
| Viscosity increase ratio of solder paste (%) | | 5.4 | 8.0 | 6.5 | 4.2 | 1.5 | 9.7 | 7.5 | 4.5 | 2.0 | 2.4 |
| Wettability 1 (immediately after production, without oxidation treatment of copper electrodes) | | 1 | 1 | 1 | 1 | 2 | 1 | 1 | 1 | 2 | 1 |
| Wettability 2 (after warmed, without oxidation treatment of copper electrodes) | | 1 | 1 | 1 | 2 | 2 | 2 | 2 | 1 | 2 | 1 |
| Wettability 3 (immediately after production, with oxidation treatment of copper electrodes) | | 1 | 1 | 1 | 2 | 2 | 2 | 2 | 1 | 2 | 1 |
| Wettability 4 (after warmed, with oxidation treatment of copper electrodes) | | 1 | 1 | 1 | 2 | 2 | 2 | 2 | 1 | 2 | 1 |

TABLE 3

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Bromine atom concentration based on 0.1 g of flux (ppm) | 0 | 210 | 360 | 24600 | 9100 | 13700 | 6500 | 6500 | 0 |
| Chlorine atom concentration based on 0.1 g of flux (ppm) | 0 | 0 | 0 | 0 | 0 | 0 | 0 | 0 | 4900 |
| Content of Component (a) or amine other than Component (a) in flux (% by weight) — BAPED (Component (a)) | 0 | 0.1 | 0.1 | 0.1 | 0 | 0 | 0 | 0 | 0.1 |
| BAPP (Component (a)) | 0 | 0 | 0 | 0 | 0 | 0 | 0 | 0 | 0 |
| TETA (Component (a)) | 0 | 0 | 0 | 0 | 0 | 0 | 0 | 0 | 0 |
| TEA | 0 | 0 | 0 | 0 | 0 | 0 | 0.5 | 0 | 0 |
| DEA | 0 | 0 | 0 | 0 | 0 | 0 | 0 | 0.5 | 0 |
| Content of Component (b) or halide other than Component (b) in flux (% by weight) — BP (Component (b)) | 0 | 0.04 | 0.07 | 2 | 0.5 | 0 | 0 | 0 | 0 |
| DBBD (Component (b)) | 0 | 0 | 0 | 2 | 1 | 0 | 1 | 1 | 0 |
| TBB (Component (b)) | 0 | 0 | 0 | 0 | 0 | 1.6 | 0 | 0 | 0 |
| DEAHC | 0 | 0 | 0 | 0 | 0 | 0 | 0 | 0 | 1.5 |
| Viscosity increase ratio of solder paste (%) | 9.5 | 5.5 | 4.5 | 25 | 11 | 20.1 | 4.9 | 3.8 | 15.3 |
| Wettability 1 (immediately after production, without oxidation treatment of copper electrodes) | 4 | 3 | 2 | 1 | 2 | 2 | 3 | 3 | 2 |
| Wettability 2 (after warmed, without oxidation treatment of copper electrodes) | 3 | 3 | 3 | 3 | 3 | 3 | 3 | 3 | 3 |
| Wettability 3 (immediately after production, with oxidation treatment of copper electrodes) | 4 | 3 | 4 | 4 | 3 | 3 | 4 | 4 | 4 |
| Wettability 4 (after warmed, with oxidation treatment of coper electrodes) | 3 | 4 | 4 | 4 | 4 | 4 | 4 | 4 | 4 |

In Tables 2 and 3, each abbreviation stands for the following.
BAPED: N,N'-bis(3-aminopropyl)ethylenediamine
BAPP: N,N'-bis(3-aminopropyl)piperazine
TETA: triethylenetetramine
TEA: triethanolamine
DEA: diethylamine
BP: 3-bromopropionic acid
DBBD: trans-2,3-dibromo-2-butene-1,4-diol
TBB: 1,2,3,4-tetrabromobutane
BBMPD: 2,2-bis(bromomethyl)-1,3-propanediol
DEAHC: diethylamine hydrochloride As is apparent from the results in Tables 2 and 3, the lead-free solder pastes using the lead-free solder fluxes of the present invention are excellent in viscosity stability and exhibits excellent wettability at the time of soldering even in atmospheric air.

The invention claimed is:

1. A lead-free solder flux having a bromine atom concentration of 400 to 20000 ppm based on 0.1 g of the flux and comprising 0.01 to 0.7% by weight of an amine compound (a) represented by the general formula (1): $H_2N-(CH_2)_n-X-(CH_2)_n-NH_2$ wherein n represents an integer of 1 to 6 and X represents $-NH-CH_2CH_2-NH-$ or a piperazine residue.

2. The lead-free solder flux according to claim 1, wherein the bromine atom is derived from at least one bromine compound (b) selected from the group consisting of a carboxyl group-containing bromine compound, a hydroxy group-containing bromine compound, an amino group-containing bromine compound and a no active hydrogen-containing bromine compound.

3. The lead-free solder flux according to claim 2, which further comprises a rosin base material (c), an activator (d) other than the component (a) and the component (b), a thixotropic agent (e) and a solvent (f).

4. The lead-free solder flux according to claim 3, wherein the rosin base material (c) is a hydrogenated rosin and/or an acrylic acid modified rosin.

5. The lead-free solder flux according to claim 1, wherein the amine compound (a) is at least one selected from the group consisting of N,N'-bis(3-aminopropyl)ethylenediamine, N,N'-bis(3-aminopropyl)piperazine and triethylenetetramine.

6. A lead-free solder paste comprising the lead-free solder flux according to claim 1 and a lead-free solder powder.

7. The lead-free solder paste according to claim 6, wherein the lead-free solder powder has an average primary particle size of 1 to 50 μm.

* * * * *